(12) United States Patent
Blatt et al.

(10) Patent No.: US 11,616,635 B2
(45) Date of Patent: Mar. 28, 2023

(54) RECURSIVE ALGORITHMS WITH DELAYED COMPUTATIONS PERFORMED IN A HOMOMORPHICALLY ENCRYPTED SPACE

(71) Applicant: Duality Technologies, Inc., Maplewood, NJ (US)

(72) Inventors: Marcelo Blatt, Modiin (IL); Matthew Triplet, Newark, NJ (US); Yuval Harness, Ramat Hasharon (IL)

(73) Assignee: Duality Technologies, Inc., Maplewood, NJ (US)

( * ) Notice: Subject to any disclaimer, the term of this patent is extended or adjusted under 35 U.S.C. 154(b) by 198 days.

(21) Appl. No.: 17/105,591

(22) Filed: Nov. 26, 2020

(65) Prior Publication Data

US 2021/0160048 A1 May 27, 2021

Related U.S. Application Data

(60) Provisional application No. 62/941,528, filed on Nov. 27, 2019.

(51) Int. Cl.
  *H04L 9/00* (2022.01)
(52) U.S. Cl.
  CPC ........ *H04L 9/008* (2013.01); *H04L 2209/125* (2013.01)
(58) Field of Classification Search
  CPC ...... H04L 9/008; H04L 2209/125; G09C 1/00
  See application file for complete search history.

(56) References Cited

U.S. PATENT DOCUMENTS

| 9,946,810 B1* | 4/2018 | Trepetin | G06F 7/00 |
|---|---|---|---|
| 10,333,696 B2* | 6/2019 | Ahmed | H04L 9/3268 |
| 10,936,744 B1* | 3/2021 | Trepetin | H04L 9/0861 |
| 2016/0004874 A1* | 1/2016 | Ioannidis | H04L 9/302 |
|  |  |  | 713/165 |
| 2019/0036678 A1* | 1/2019 | Ahmed | H04L 9/302 |

FOREIGN PATENT DOCUMENTS

| WO | WO-2015024173 A1 * | 2/2015 | H04L 63/08 |
|---|---|---|---|
| WO | WO-2018080857 A1 * | 5/2018 | |
| WO | WO-2019094303 A1 * | 5/2019 | H04L 9/006 |

\* cited by examiner

*Primary Examiner* — Ellen Tran
(74) *Attorney, Agent, or Firm* — Pearl Cohen Zedek Latzer Baratz LLP

(57) ABSTRACT

A device, system and method for securely executing recursive computations over encrypted data in a homomorphically encrypted (HE) space. For a recursive algorithm with sequentially dependent recursive iterations, executing the recursive algorithm in parallel by computing multiple recursive iterations simultaneously over multiple parallel execution iterations and not in sequential order. Each parallel execution iteration may compute a partial HE solution of multiple sequential recursive iterations comprising a known HE part and leaves empty a placeholder call slot for an unknown HE part. Placeholder call slots remain empty and are filled at delayed times at a later parallel execution iteration from when the known part of the same HE computation is computed. A final HE solution is computed in fewer multiple parallel execution iterations than the number of sequential recursive iterations, thereby accelerating the recursive algorithm in HE space.

20 Claims, 4 Drawing Sheets

RECURSIVE ALGORITHMS WITH DELAYED COMPUTATIONS PERFORMED IN A HOMOMORPHICALLY ENCRYPTED SPACE

CROSS-REFERENCE TO RELATED APPLICATIONS

This application claims the benefit of U.S. Provisional Patent Application Serial No. 62/941,528, filed Nov. 27, 2019, which is hereby incorporated by reference in its entirety.

FIELD OF THE INVENTION

Embodiments of the invention are directed to data privacy, security, and homomorphic encryption of secret data.

BACKGROUND OF THE INVENTION

Today, massive amounts of data live in many organizations, with barriers between them, erected by mistrust, economic incentives and regulatory hurdles. When secret data, such as, personal or medical data is involved, privacy becomes a major concern for all parties involved, as that information can be used to identify or exploit the individuals.

To encourage collaboration, while still protecting data secrecy, cryptosystems have been developed that allow parties to operate and perform computations on encrypted data (i.e., ciphertexts) in an encrypted domain. Homomorphic Encryption (HE) cryptosystems are especially useful for these purposes as they allow a third party to evaluate any computation on encrypted data without learning anything about it, such that only the legitimate recipient of the homomorphic calculation will be able to decrypt it using the recipient's secret key.

Although HE can theoretically work on any data, HE is extremely slow because the source data is encrypted in a representation significantly larger than the source data, so many more operations need to be performed to support computations on encrypted data (i.e. cyphertexts) than the unencrypted source data (i.e. plain text).

HE is particularly inefficient when used for recursive algorithms. A recursive algorithm is one that repeatedly calls its own result from one iteration as an input for a subsequent iteration. The number of recursive iterations may be referred to as a recursive "depth." Because computations in a subsequent iteration depend on an output from a previous iteration, recursive algorithms are conventionally performed sequentially, one iteration at a time. Because of their depth and sequential execution, recursive algorithms tend to be slow in nature.

To optimize efficiency, recursive algorithms often employ a test at each iteration to determine whether or not a condition (e.g., threshold accuracy) has been met sufficient to conclude the algorithm early, or if the recursive algorithm should continue. However, such an early termination test generally requires evaluating plaintext intermediate solutions. When performing recursion in an encrypted space, all data is encrypted and therefore intermediate solutions cannot be evaluated. Thus, recursive algorithms performed in a homomorphically encrypted space tend to proceed to their final iteration (full-depth) with no opportunity for early termination, which typically results in an overabundance of computations, thus wasting computer resources.

The combination of the complexity of HE computations with the cumbersome nature of recursive algorithms, especially with no opportunity for early termination optimizations, makes HE impractical for many recursive algorithms. Accordingly, there is a long felt need in the art for fast and efficient algorithms to perform recursive computations in a homomorphically encrypted space.

SUMMARY OF EMBODIMENTS OF THE INVENTION

Embodiments of the invention solve this long felt need in the art by providing a device, system, and method to enable fast and efficient recursive computations in a homomorphically encrypted space. In an embodiment of the invention, a device, system and method is provided for securely executing recursive computations over encrypted data in a homomorphically encrypted space. For a recursive algorithm in which each sequential recursive iteration depends on a complete homomorphically encrypted solution from a previous recursive iteration, embodiments of the invention may execute the recursive algorithm in parallel by computing multiple recursive iterations simultaneously over multiple parallel execution iterations and not in sequential order. Each of a plurality of the parallel execution iterations may compute a partial homomorphically encrypted solution of multiple sequential recursive iterations comprising a part of the homomorphically encrypted computation that is known and leaves empty a placeholder call slot in place of a part of the computation that is unknown that depends on a complete homomorphically encrypted solution from a previous recursive iteration. The placeholder call slots may remain empty and may be filled at delayed times at a later parallel execution iteration from when the known part of the same homomorphically encrypted computation is computed. The multiple parallel execution iterations may cumulatively compute a final homomorphically encrypted solution to the recursive algorithm in fewer multiple parallel execution iterations than the number of sequential recursive iterations, such that the final homomorphically encrypted solution to the recursive algorithm when decrypted is equivalent to executing the recursive algorithm on unencrypted data. The final homomorphically encrypted solution may be sent to an secure external party device that stores one or more secret decryption keys in local memory to decrypt the final homomorphically encrypted solution, and retrieve the corresponding unencrypted solution in unencrypted space.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
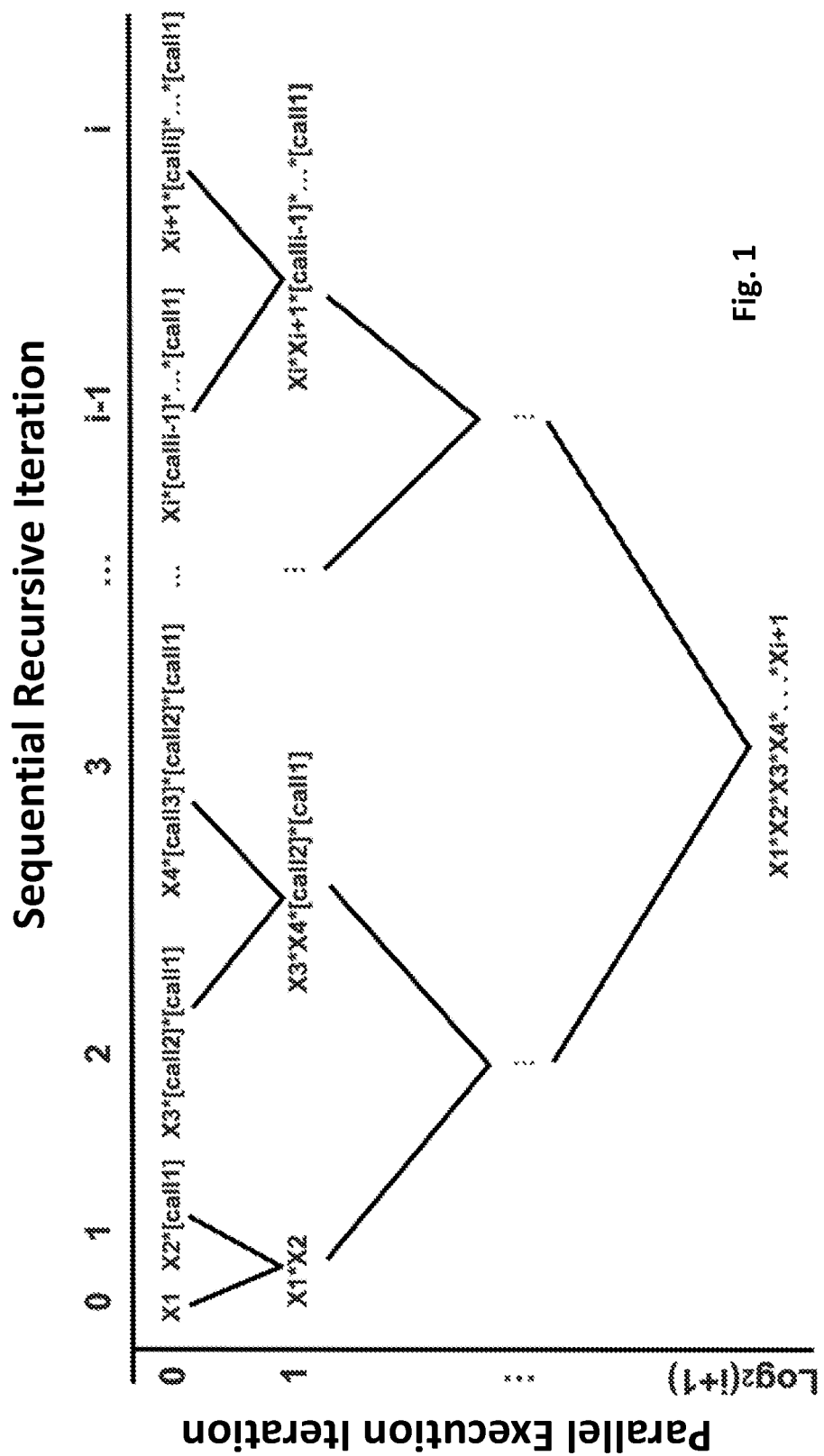
FIG. 1 schematically illustrates example data structures for executing recursive computations in parallel over encrypted data in a homomorphically encrypted space, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

While recursion is efficient in plaintext space, the same cannot be said for homomorphically encrypted space. Firstly, recursive algorithms often have relatively large depths that require many sequential iterations to be executed one after another, which is typically prohibitively slow in homomorphically encrypted space. Secondly, recursive optimization such as early termination requires testing the accuracy of intermediate results, which is not possible because all data is encrypted in homomorphically encrypted space.

To overcome the aforementioned problems inherent in the art, embodiments of the invention provide fast and efficient recursive algorithms in homomorphically encrypted space by reorganizing the call structure of recursive algorithms. In homomorphically encrypted space, because there is no possibility for testing intermediate results and thus early termination, there is no longer a benefit to sequentially executing the iterations, one iteration after another. Accordingly, instead of executing each recursive iteration sequentially (e.g., each iteration depending on and only executed after completion of a previous iteration), embodiments of the invention provide "placeholder" or empty recursive calls or slots to input results from previous iterations. These placeholder recursive calls may remain empty and may be filled non-sequentially, rescheduled at delayed times or out of recursive iterative order. By freeing the recursive algorithm of sequential execution, operations in multiple iterations may be performed independently and in parallel (not in sequential order). The placeholder recursive calls across multiple iterations may thus be filled simultaneously (e.g., at the same or overlapping times), thereby increasing the efficiency of the HE recursive algorithm.

Consider example one, a recursive algorithm that is a simple product of prior products: $w_1 * w_2 * \ldots * w_{2k}$. The conventional algorithm would perform $2k-1$ sequential multiplications, which corresponds to a recursive depth of $2k-1$. In this algorithm, each prior ith multiplication must complete before proceeding to the next $i+1$ multiplication, which is extremely slow in HE, especially for large k. In contrast, embodiments of the invention provide empty placeholder calls for intermediate products, such that all or multiple iterations may be solved (at least partially) simultaneously (or in overlapping times). As an example, this recursive algorithm may be reordered to simultaneously execute parallel pairwise $2^m$ multiplications across all or multiple m iterations: a first iteration executing single pair ($2^1$) products (w1*w2), (w3*w4), ..., (w2k-1*w2k), a second iteration executing pairs of pair ($2^2$) products (w1*w2)*(w3*w4), ..., (w2k-3*w2k-2)*(w2k-1*w2k), and so on, until a $\log_2 2k$ iteration executing products of all products (w1*w2)*(w3*w4)* ... *(w2k-1*w2k). For an example k of 16, whereas the conventional algorithm uses a number of multiplicative iterations or depth of 31 (e.g., above the acceptable HE depth range of 8-14), the above algorithm is solved according to embodiments of the invention using a number of multiplicative iterations or depth of only 5, e.g., well below the standard acceptable HE depth range of 8-14, and so efficiently executed in HE. In general, such a logarithmic reduction in the number of computations or recursive depth results in an exponential increase in processor speed and reduction in execution time.

Consider example two, recursive approximation of an integral using the trapezoidal rule:

$$\int_a^b f(x) \approx \frac{\Delta x}{2} \left[ f(x_1) + 2f(x_2) + 2f(x_3) + \ldots + 2f(x_{2k-1}) + f(x_{2k}) \right]$$

$$\text{where } \Delta x = \frac{b-a}{2k}, \, x_i = a + (i-1)\Delta x,$$

and 2k being the number of subintervals (a larger k indicating a more accurate integration). Conventionally, the computations of this algorithim are executed sequentially corresponding to a recursive depth of $2k-1$. According to embodiments of the invention, this recursive integration approximation algorithim may be reordered so as to simultaneously execute $2^m$ additions across all or multiple m iterations: a first iteration executing single pair ($2^1$) products $(f(x_1)+2f(x_2))$, $(2f(x_3)+2f(x_4))$, ..., $(2f(x_{2k-1})+f(x_{2k}))$, a second iteration executing pairs of pair ($2^2$) additions $(f(x_1)+2f(x_2))+(2f(x_3)+2f(x_4))$, ..., $(2f(x_{2k-3})+f(x_{2k-2}))+(2f(x_{2k-1})+f(x_{2k}))$, and so on, until a $\log_2 2k$ iteration executing addition of all additions. In effect, reducing the depth from the conventional case of $2k-1$ to $\log_2 2k$. If we let k=16 a conventional depth of 31 may be reduced to 5, from an additive depth that is difficult or impractical on homomorphically encrypted data to one that is relatively easier, feasible and practical in homomorphically encrypted space.

Consider example three in which we take another look at the aforementioned trapezoidal rule for recursively approximating an integral:

$$\int_a^b f(x) \approx \frac{\Delta x}{2} \left[ f(x_1) + 2f(x_2) + 2f(x_3) + \ldots + 2f(x_{2k-1}) + f(x_{2k}) \right]$$

$$\text{where } \Delta x = \frac{b-a}{2k}, \, x_i = a + (i-1)\Delta x,$$

and 2k being the number of subintervals (a larger k indicating a more accurate integration). According to embodiments of the invention, this recursive integration approximation algorithm may be reordered so as to simultaneously execute $4^m$ additions across all or multiple m iterations: a first iteration executing single pair ($4^1$) products $(f(x_1)+2f(x_2)+2f(x_3)+2f(x_4))$, ..., $(2f(x_{2k-3})+2f(x_{2k-2})+2f(x_{2k-1})+f(x_{2k}))$, a second iteration executing pairs of pair ($4^2$) additions $((f(x_1)+2f(x_2)+2f(x_3)+2f(x_4))+(f(x_5)+2f(x_6)+2f(x_7)+2f(x_8))+(f(x_9)+2f(x_{10})+2f(x_{11})+2f(x_{12}))+(f(x_{13})+2f(x_{14})+2f(x_{15})+2f(x_{16})))$, ..., $((2f(x_{2k-15})+2f(x_{2k-14})+2f(x_{2k-13})+f(x_{2k-12}))+(2f(x_{2k-11})+2f(x_{2k-10})+2f(x_{2k-9})+f(x_{2k-8}))+(2f(x_{2k-7})+2f(x_{2k-6})+2f(x_{2k-5})+f(x_{2k-4}))+(2f(x_{2k-3})+2f(x_{2k-2})+2f(x_{2k-1})+f(x_{2k})))$, and so on, until a $\log_4 2k$ iteration executing addition of all additions. In effect, reducing the depth from the conventional case of 2k−1 (discussed in more detail in the previous examples) to $\log_4 2k$. If we let k=32 a conventional depth of 63 may be reduced to 3, from an additive depth that is difficult or impractical on homomorphically encrypted data to one that is relatively more feasible and practical in homomorphically encrypted space. Increasing the division value in pairwise computations may be particularly useful for securely executing recursive computations over large data sets in a homomorphically encrypted space.

Embodiments of the invention allow recursive computations to be reorganized non-sequentially using empty placeholder call functions, such that, computations across multiple or all recursive iterations may be performed at least partially simultaneously or in parallel. Breaking the sequential nature of recursive algorithms into parallel structures significantly reduces the number of computations and/or recursive depth of the algorithm to allow the algorithm to be executed in significantly faster processing time and using significantly fewer iterations, as compared to conventional sequential recursive algorithms. Due to the complex nature of HE computations, this speed up is often critical to allow recursion in HE space in practical time or within a threshold acceptable recursive depth. In addition, because embodiments of the invention reduce the number of computations and/or recursive depth, fewer intermediate results are stored, thereby reducing memory usage, as compared to conventional sequential recursive algorithms. Further, due to this increase in efficiency, for the same computational time, recursive algorithms according to embodiments of the invention may execute a significantly greater number of computations and/or recursive depth for increased accuracy, as compared to conventional sequential recursive algorithms.

Reference is made to FIG. 1, which schematically illustrates example data structures for executing recursive computations in parallel over encrypted data in a homomorphically encrypted space, according to some embodiments of the invention. In the example recursive algorithm of FIG. 1, a "binary tree" arrangement of data structures is used merely for the purpose of illustration and is not meant to be limiting. In general, embodiments of the invention pertain to any other recursive relationship(s) between any number of data structures, e.g., including but not limited to, recursive call loops, skips, jumps, nesting structures, etc.

In the example recursive algorithm of FIG. 1, the horizontal axis represents an index or depth of a "recursive iteration" for the recursive algorithm (e.g., the order of dependency between the computations in the recursive algorithm). For example, each sequential recursive iteration i may depend on a (e.g., complete) homomorphically encrypted solution from a sequentially previous recursive iteration i−1. The vertical axis may represent an index or depth of an "execution iteration" for the recursive algorithm (e.g., the order in which the computations are executed). In conventional recursive algorithms, recursive iteration and execution iteration are typically equivalent, i.e., recursive iterations are performed in sequential execution iterations, one after the other (e.g., executing recursive iteration i after i−1, such that the recursive iteration is the same as the execution iteration). In contrast, in embodiments of the invention, the recursive iteration and execution iteration are different and out of order. Embodiments of the invention may execute a sequence of recursive iterations non-sequentially and in parallel execution iterations by solving multiple recursive iterations simultaneously in each of multiple parallel execution iterations (e.g., executing at least portions of some recursive iterations out of order, such that at least a portion of recursive iteration i is executed before i−1).

Embodiments of the invention may reorganize the order of executing computations in recursive iterations from conventionally sequential execution iterations to parallel execution iterations. An example of parallelized execution iterations is shown by the parallelized data structure FIG. 1. Because recursive algorithms have sequentially dependent recursive iterations, to break from executing them in sequential order, empty placeholder call slots (e.g., [call1], [call2], [call3], . . . ) occupy memory slots or data structures of the parts of the recursive computations that are unknown (that depend from computations in previous recursive iterations that have not yet been solved), to allow the remaining partial computations (e.g., X1, X2, X3, . . . ) to be solved before their full predecessor entries are completed. This allows multiple partial solutions of multiple sequential recursive iterations (e.g., multiple or all row indices 0–i) to be solved simultaneously and in parallel (in a single execution iteration e.g., indicated by a single column index j). Each partial HE solution includes a known portion represented by HE data entry [Xi] and an unknown portion represented by empty call slot [calli]. Each call slot [calli] is ultimately filled with the respective data entry [Xi] indicated by the same subscript (e.g., [call1]→X1, [call2]→X2, [call3]→X3, [call1]*[call2]→X1*X2).

At the start of the recursive algorithm, in the first parallel execution iteration (row 1) of FIG. 1, all recursive iterations, except the first, (e.g., recursive iterations 2–i) are only partial (not fully) solved in that they contain unknown values that are represented by the empty placeholder call slots [calli]. The placeholder call slots for each recursive iteration (e.g., row indices) remain empty and are filled at delayed times, out of sequential recursive iteration order, in parallelized execution iterations (e.g., column indices), after each complete homomorphically encrypted solution from a previous recursive iteration is computed. Data structures may be composed by any operation, notated by "*", which represents a general computation of any form, such as, any one or combination of multiplication, addition, inversion, nesting, intersection, etc. For example, a multiplication operation is discussed in first example and an addition operation is discussed in the second and third examples above.

Additionally, according to embodiments of the invention, empty placeholder call slots may also be filled out of parallel execution iterative order. For example, while data structures may start to be solved with a partial solution in a certain execution iteration order, final solutions to those data structures may be completed in a different execution iteration order (out of sequential execution iteration order). Some embodiments may skip execution iterations by forwarding computed intermediate HE solutions to fill empty placeholder call slots of a non-adjacent later parallel execution iteration. Some embodiments may loop or jump backwards by calling HE solutions to fill empty placeholder call slots of the same (loop) or previous (backward) execution iterations.

In the example of the first parallel execution iteration (vertical index 1) of FIG. 1, partial homomorphic encrypted solutions are composed by combining pairs of partial solutions from the previous zeroth parallel execution iteration (vertical index 0). In each parallel execution iteration, computations of the placeholder call slots previously empty in a previous $(i-1^{th})$ parallel execution iteration are filled in a subsequent $(i^{th})$ parallel execution iteration. Some computations fill all empty placeholder slots to form complete intermediate solutions (e.g., with no remaining empty placeholder slots). For example, partial solution X2*[call1] in row 0, column 1 of the $0^{th}$ parallel execution iteration becomes complete solution X1*X2 in row 1, bridging column 0-1 of the $1^{st}$ parallel execution iteration. Other computations fill some, but not all, empty placeholder slots to form incomplete or partial intermediate solutions. For example, the placeholder call slot of the composition of [call2]*[call1] in row 1, bridging column 2-3 of the $1^{st}$ parallel execution iteration remains empty after the $1^{st}$ parallel execution iteration and its computation X3*X4*[call2]*[call1] remains a partial solution.

In the example of the second parallel execution iteration (vertical index 2), partial homomorphic encrypted solutions are composed by combining pairs of the pairs composed of partial solutions from the previous first parallel execution iteration (vertical index 1). In each parallel execution iteration, computations of at least some placeholder call slots previously empty in a previous ($1^{st}$) parallel execution iteration are filled in a subsequent ($2^{nd}$) parallel execution iteration. Some computations fill all empty placeholder slots to form complete intermediate solutions (X1*X2*X3*X4 in row 2, bridging columns 1-4), while other computations fill some, but not all, empty placeholder slots to form incomplete or partial intermediate solutions (e.g., X5*X6*X7*X8*[call4]*[call3]*[call2]*[call1] remains a partial solution in the second parallel execution iteration).

In general, in the mth parallel execution iteration, pairs of partially solved recursive iterations from the m−1 previous parallel execution iterations are composed, thereby combining $$\frac{i+1}{2^m}$$

partial homomorphic encrypted solutions of the mth parallel execution iteration for i+1 recursive iterations. To execute the total number of i recursive iterations, embodiments of the invention thereby execute $\log_2(i+1)$ parallel execution iterations. In general, any number of q recursive iterations may be composed to achieve any $$\frac{i+1}{q^m}$$

sequential recursive iterations per mth parallel execution iteration, executed by $\log_q(i+1)$ parallel execution iterations. Additionally, according to embodiments of the invention, the value of q may vary across parallel execution iterations and/or within the same parallel execution iteration. Reduction to a logarithmic margin of computations results in an exponential decrease in the number of computations and exponential increase in speed of the recursive algorithm.

Overall, the multiple parallel execution iterations cumulatively compute a final homomorphically encrypted solution to the recursive algorithm in fewer multiple parallel execution iterations (e.g., $\log_q(i+1)$) than the number of sequential recursive iterations (i). All this is performed in the homomorphically encrypted space so that only HE solutions and no underlying decrypted data is revealed to any party that does not have the secret decryption key(s). Through homomorphic encryption, an equivalent recursive algorithm is securely performed, such that the final homomorphically encrypted solution to the recursive algorithm when decrypted is equivalent to executing the recursive algorithm on the underlying unencrypted data, though without exposing the unencrypted data.

Figure 2:
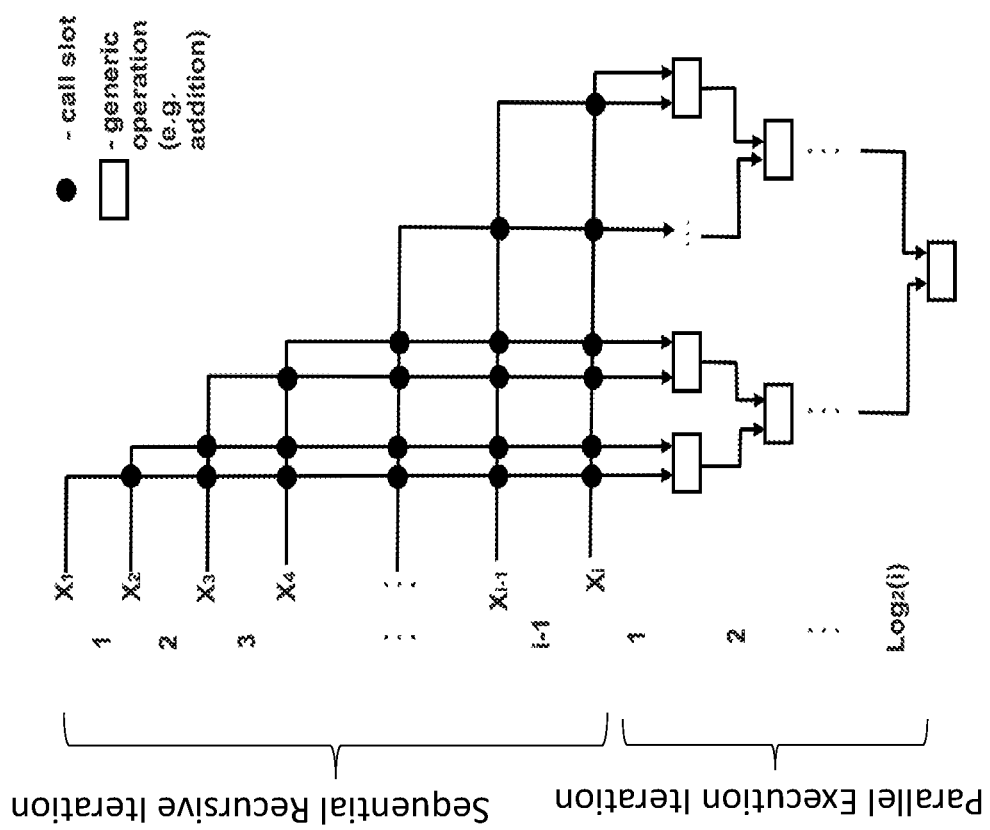
FIG. 2 schematically illustrates a recursive algorithm with an example circuit data structure for executing recursive computations in parallel over encrypted data in a homomorphically encrypted space, according to some embodiments of the invention.

Reference is made to FIG. 2, which schematically illustrates a recursive algorithm with an example circuit data structure for executing recursive computations in parallel over encrypted data in a homomorphically encrypted space, according to some embodiments of the invention. In FIG. 2, a circuit connects combinations of any or all q data values by any generic composition operation. Placeholder call slots remain empty for the unknown part of any such arbitrary combinations of data values, and are filled in at time delays from when the known part of the same generic composition operation is computed. Connections between call slots and generic operations are shown only for the first parallel execution iteration to reduce clutter in the figure, but apply to all parallel execution iterations. Further, not all call slots feed each generic operation, such that, many connections in the figure may be omitted according to which operations call which data structures.

Figure 3:
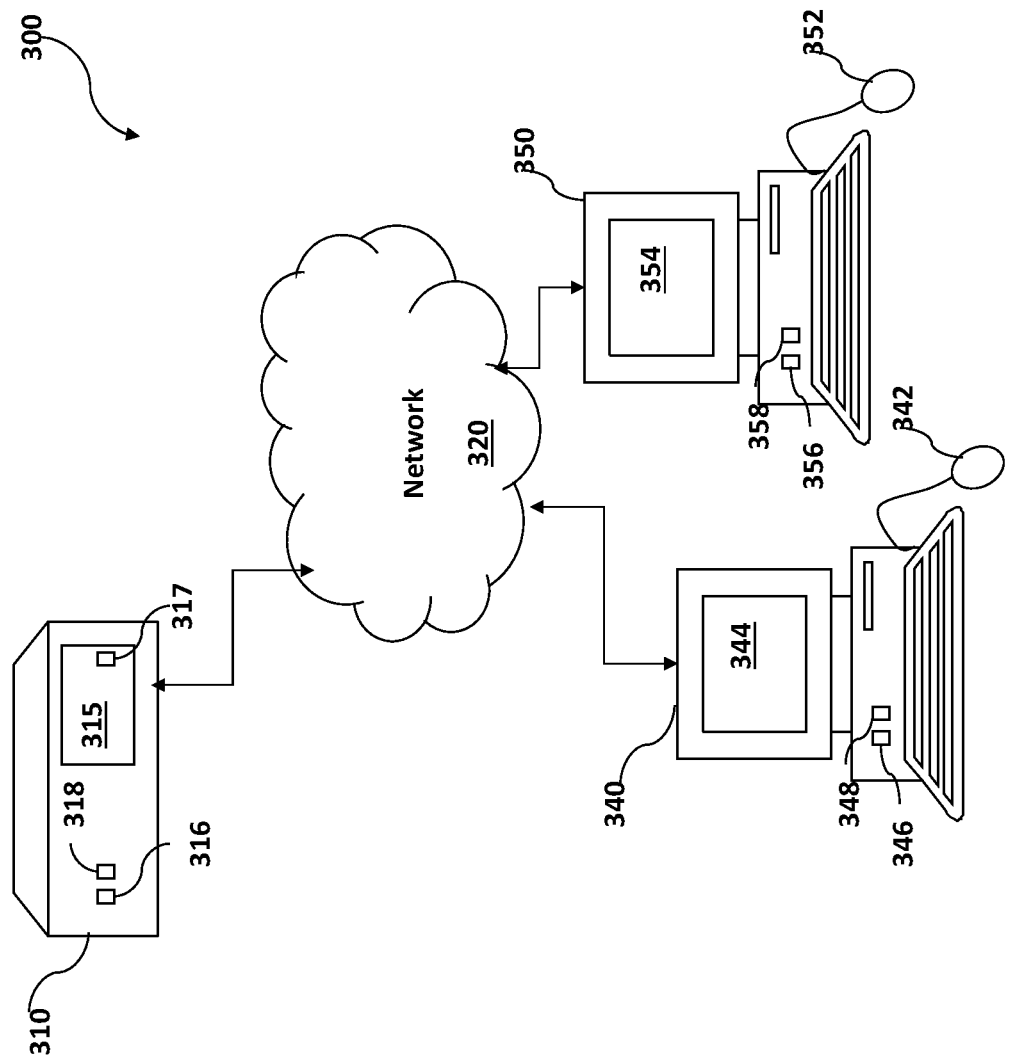
FIG. 3 is an example system for executing a recursive algorithm over encrypted data in a homomorphically encrypted space, according to some embodiments of the invention.

Reference is made to FIG. 3, which schematically illustrates an example system for securely executing recursive computations over encrypted data in a homomorphically encrypted space, according to some embodiments of the invention. System 300 may include one or more encryption devices 340 and/or 350, and a computing device 310, all of which are connected via a network 320. While computing device 310 is described to execute recursive computations herein, any one or more of other devices 340, 350 and/or any number of P devices (operated by the same or P different parties) may additionally or alternatively execute those computations.

Encryption devices 340 and 350 may store plaintext data to be encrypted, encrypted data to be decrypted, one or more public encryption keys for encrypting, and/or one or more corresponding private or secret decryption keys for decrypting. Encryption devices 340 and 350 may include applications for encrypting respective plaintext data using the same or different encryption keys to generate respective encrypted data. Computing device 310 may include applications to access and retrieve the encrypted data sets from one or both encryption devices 340 and 350 via network 320. Computing device 310 may include applications for executing recursive computations over encrypted data in an encrypted space. Secret decryption keys are typically stored in memory 348 and 358 of respective encryption devices 340 and 350, such that, computing device 310 does not have access to the secret decryption keys. Accordingly, computing device 310 cannot decrypt the encrypted datasets received from respective encryption devices 340 and 350, and may only execute recursive computations in the encrypted (not plaintext) space. Once executed, computing device 310 may transfer encrypted results of said computations to encryption devices 340 and/or 350 via network 320. Encryption devices 340 and 350 may include applications for retrieving and decrypting encrypted results sent from computing device 310 via network 320. Additionally or alternatively, computing device 310 may include applications for transferring encrypted computation results to another not shown trusted device that may itself include applications for retrieving and decrypting encrypted results sent from computing device 310.

Computing device 310 may include or be operably connected to a database 315, which may contain software processes or applications for storing and retrieving data 317 such as encrypted data. Data 317 may also include code (e.g., software code), logic, or circuits, e.g., to execute recursive computations over encrypted data in an encrypted space according to embodiments of the invention. Database 315 may be internal or external to computing device 310 and may be connected thereto by a local or remote and a wired or wireless connection.

Computing device 310 and encryption devices 340 and 350, may be servers, personal computers, desktop computers, mobile computers, laptop computers, and notebook computers or any other suitable device such as a cellular telephone, personal digital assistant (PDA), video game console, etc., and may include wired or wireless connections or modems, or users operating such devices. Encryption devices 340 and 350 may include one or more input devices 342 and 352, respectively, for receiving input from a user (e.g., via a pointing device, click-wheel or mouse, keys, touch screen, recorder/microphone, other input components). Encryption devices 340 and 350 may include one or more output devices 344 and 354, respectively, (e.g., a monitor or screen) for displaying data to a user provided by or for computing device 310.

Network 320, which connects computing device 310 and encryption devices 340 and/or 350, may be any public or private network such as the Internet. Access to network 320 may be through wire line, terrestrial wireless, satellite or other systems well known in the art.

Computing device 310 and encryption devices 340 and 350 may include one or more controller(s) or processor(s) 316, 346, and 356, respectively, for executing operations according to embodiments of the invention and one or more memory unit(s) 318, 348, and 358, respectively, for storing data (e.g., keys and encrypted or decrypted data) and/or instructions (e.g., software for applying keys to encrypt or decrypt data, or execute recursive computations over encrypted data in an encrypted space according to embodiments of the invention) executable by the processor(s). Processor(s) 316, 346, and/or 356 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 318, 348, and/or 358 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments of the invention, other devices or combinations of devices may be used in system 300. System 300 components from multiple different devices may be combined into a single device or components from a single device may be separated into multiple different devices.

Figure 4:
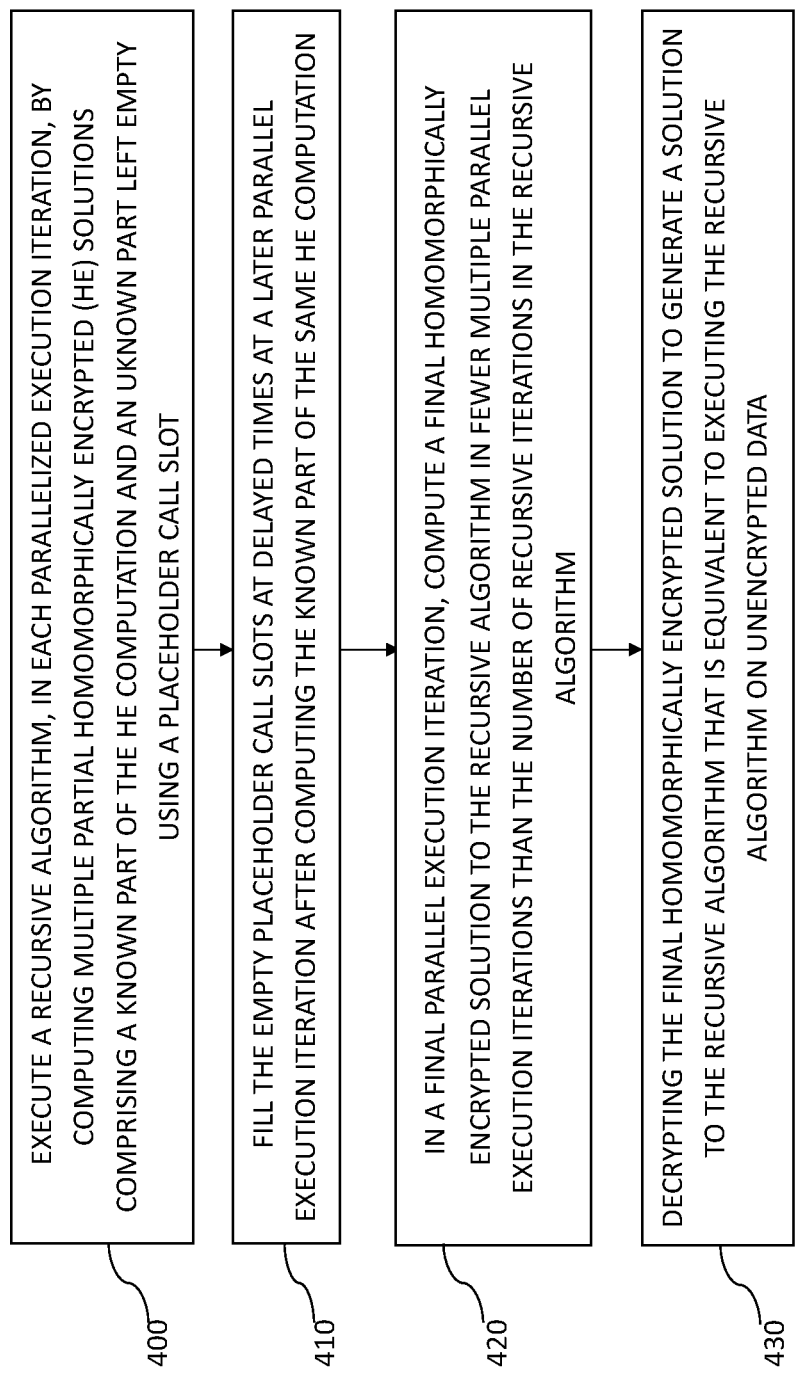
FIG. 4 is a method for executing a recursive algorithm comprising recursive computations over encrypted data in a homomorphically encrypted space, according to some embodiments of the invention.

Reference is made to FIG. 4, which schematically illustrates a flowchart of a method for securely executing recursive computations over encrypted data in a homomorphically encrypted space, according to some embodiments of the invention. The operation(s) of FIG. 4 may be performed using devices or components disclosed in reference to the system of FIG. 3, using the data structures disclosed in reference to FIG. 1 and/or FIG. 2. For example, the operation(s) of FIG. 4 may be performed using one or more processors 316 of computing device 310 of FIG. 3, but may additionally or alternatively be performed using one or more processors 348 and 358 of encryption devices 340 of FIG. 3. Other devices or systems may also be used.

In operation 400, one or more memories (e.g., 318 of FIG. 3) may store instructions to perform a recursive algorithm, in which each sequential recursive iteration depends on a complete homomorphically encrypted solution from a previous recursive iteration. One or more processors (e.g., 316 of FIG. 3) may execute the recursive algorithm in parallel by computing the multiple recursive iterations (e.g., horizontal indices 0 to i of the first row of FIG. 1) simultaneously over multiple parallel execution iterations (e.g., vertical indices 0 to $\log_2(i+1)$ of FIG. 1, rows 1 to $\log_2(i)$ of FIG. 2) and not in sequential order. Each of a plurality of the parallel execution iterations (e.g., each row of FIG. 1) may compute a partial homomorphically encrypted solution of multiple sequential recursive iterations including a part of the homomorphically encrypted computation that is known (e.g., Xi's of FIG. 1) and may leave empty a placeholder call slot (e.g., [callj]'s of FIG. 1) in place of a part of the computation that is unknown that depends on a complete homomorphically encrypted solution from a previous recursive iteration (e.g., i>j).

In some embodiments, the one or more processors may arrange the multiple parallel execution iterations in a tree structure (e.g., the binary tree of FIG. 1). Distal leaf nodes may represent an initial parallel execution iteration (e.g. top row with vertical index 0 of FIG. 1). Each row of successively proximal leaf nodes (e.g., in sequentially lower rows in FIG. 1) may represent a subsequent parallel execution iteration linking the placeholder call slots in the proximal leaf nodes by branches to the homomorphically encrypted solutions in relatively distal leaf nodes from which they depend (e.g., lower row nodes calling results from higher row nodes). A root node (e.g., in the bottom row of FIG. 1) may be connected to a plurality of leaf nodes and may represent the final homomorphically encrypted solution (e.g., X1*X2*X3*X4* . . . *Xi+1 of execution iteration $\log_2(i+1)$ of FIG. 1) to the recursive algorithm.

In some embodiments, the one or more processors may arrange multiple parallel execution iterations in a circuit structure (e.g., FIG. 2). This embodiment may allow computations of homomorphically encrypted solutions to occur out of sequential recursive and/or parallel execution iterative order. For example, as shown in FIG. 2, each recursive generic computation (indicated by a box symbol in FIG. 2) may include any number of call slots [calli] to compose any combination of recursive terms [Xi] (e.g., composing X1*X2 as in FIG. 1 or other compositions, such as, X1*X4*X8*X12).

In operation 410, one or more processors (e.g., 316 of FIG. 3) may fill the empty placeholder call slots (e.g., [callj] of FIG. 1) at delayed times at a later parallel execution iteration from when the known part of the same homomorphically encrypted computation (e.g., [Xi] of FIG. 1) is computed (e.g., i>j). For example, whereas recursive iteration j is after recursive iteration i and so computation Xj recursively depends on computation Xi, Xj may fill placeholder call slot [callj] at a later sequential execution iteration than Xi is computed (e.g., in an initial execution iteration or by filling its own placeholder call slot [calli]).

In some embodiments, the one or more processors may fill empty placeholder call slots out of the order of the parallel execution iterations. An empty placeholder call slot may depend on a complete homomorphically encrypted solution computed in a concurrent parallel execution iteration or subsequent parallel execution iterations. In some embodiments, the one or more processors may connect the empty placeholder call slot to the dependent complete homomorphically encrypted solution via a loop in the concurrent parallel execution iteration or a reverse call function from the subsequent parallel execution iteration.

In operation 420, one or more processors (e.g., 316 of FIG. 3) may cumulatively compute, by multiple parallel execution iterations, a final homomorphically encrypted solution to the recursive algorithm in fewer multiple parallel execution iterations (e.g., $\log_2(i+1)$ in FIG. 1) than the number of sequential recursive iterations (e.g., i in FIG. 1). The final homomorphically encrypted solution to the recursive algorithm when decrypted may be equivalent to executing the recursive algorithm on unencrypted data.

In some embodiments, the one or more processors may compute each homomorphically encrypted solution in an mth parallel execution iteration to depend on a predetermined number, q, of homomorphically encrypted solutions from a previous m−1th parallel execution iteration. In some embodiments, the one or more processors may compute the final homomorphically encrypted solution of the recursive algorithm in $m=\log_q(i+1)$ parallel execution iterations when the recursive algorithm has i recursive sequential iterations. In some embodiments, the one or more processors may compute a total of $$\frac{i+1}{q^m}$$

partial homomorphically encrypted solutions in each mth parallel execution iteration when the recursive algorithm has i recursive sequential iterations. In some embodiments, the one or more processors may execute $$\sum_{k=1}^{m} \frac{i+1}{q^k}$$

recursive sequential iterations in m parallel execution iterations.

In operation 430, one or more processors (e.g., 346, 356 of FIG. 3, and/or a different processor) of decrypting device(s) (e.g., 340 and 350 of FIG. 3) may decrypt the final homomorphically encrypted solution to generate a solution to the recursive algorithm that is equivalent to executing the recursive algorithm on unencrypted data. The decrypting device(s) may include one or more memories (e.g., 348, 358 of FIG. 3, and/or a different memory) to store the secret encryption keys to decrypt the encrypted data.

Other or additional operations may be executed in the same or different order.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments. Accordingly, the scope of the invention should not be limited by what has thus far been described, but by the appended claims and their legal equivalents.

The invention claimed is:

1. A method for securely executing recursive computations over encrypted data in a homomorphically encrypted space, the method comprising:

for a recursive algorithm in which each sequential recursive iteration depends on a complete homomorphically encrypted solution from a previous recursive iteration, executing the recursive algorithm in parallel by computing multiple recursive iterations simultaneously over multiple parallel execution iterations and not in sequential order, wherein each of a plurality of the parallel execution iterations computes a partial homomorphically encrypted solution of multiple sequential recursive iterations comprising a part of the homomorphically encrypted computation that is known and leaves empty a placeholder call slot in place of a part of the computation that is unknown that depends on a complete homomorphically encrypted solution from a previous recursive iteration, wherein the placeholder call slots remain empty and are filled at delayed times at a later parallel execution iteration from when the known part of the same homomorphically encrypted computation is computed, and wherein the multiple parallel execution iterations cumulatively compute a final homomorphically encrypted solution to the recursive algorithm in fewer multiple parallel execution iterations than the number of sequential recursive iterations, such that the final homomorphically encrypted solution to the recursive algorithm when decrypted is equivalent to executing the recursive algorithm on unencrypted data.

2. The method of claim 1, wherein the multiple parallel execution iterations are arranged in a tree structure, such that:

distal leaf nodes represent an initial parallel execution iteration, each row of successively proximal leaf nodes represents a subsequent parallel execution iteration linking the placeholder call slots in the proximal leaf nodes by branches to the homomorphically encrypted solutions in other leaf nodes from which they depend, and a root node, connected to a plurality of leaf nodes, represents the final homomorphically encrypted solution to the recursive algorithm.

3. The method of claim 1, wherein the multiple parallel execution iterations are arranged in a circuit structure.

4. The method of claim 1 comprising computing each homomorphically encrypted solution in an mth parallel execution iteration to depend on a predetermined number, q, of homomorphically encrypted solutions from a previous m−1th parallel execution iteration.

5. The method of claim 4 comprising, when the recursive algorithm has i recursive sequential iterations, computing the final homomorphically encrypted solution of the recursive algorithm in m=$\log_q(i+1)$ parallel execution iterations.

6. The method of claim 5 comprising, when the recursive algorithm has i recursive sequential iterations, computing a total of $$\frac{i+1}{q^m}$$

partial homomorphically encrypted solutions in each mth parallel execution iteration.

7. The method claim 4, wherein $$\sum_{k=1}^{m} \frac{i+1}{q^k}$$

recursive sequential iterations are executed in m parallel execution iterations.

8. The method of claim 1 comprising filling empty placeholder call slots out of the order of the parallel execution iterations, wherein an empty placeholder call slot depends on a complete homomorphically encrypted solution computed in a concurrent or subsequent parallel execution iterations.

9. The method of claim 8, wherein the empty placeholder call slot is connected to the dependent complete homomorphically encrypted solution via a loop in the concurrent parallel execution iteration or a reverse call function from the subsequent parallel execution iteration.

10. A system for securely executing recursive computations over encrypted data in a homomorphically encrypted space, the system comprising:

one or more processors configured to, for a recursive algorithm in which each sequential recursive iteration depends on a complete homomorphically encrypted solution from a previous recursive iteration, execute the recursive algorithm on the encrypted data in parallel by computing multiple recursive iterations simultaneously over multiple parallel execution iterations and not in sequential order, wherein each of a plurality of the parallel execution iterations computes a partial homomorphically encrypted solution of multiple sequential recursive iterations comprising a part of the homomorphically encrypted computation that is known and leaves empty a placeholder call slot in place of a part of the computation that is unknown that depends on a complete homomorphically encrypted solution from a previous recursive iteration, wherein the placeholder call slots remain empty and are filled at delayed times at a later parallel execution iteration from when the known part of the same homomorphically encrypted computation is computed, wherein the multiple parallel execution iterations cumulatively compute a final homomorphically encrypted solution to the recursive algorithm in fewer multiple parallel execution iterations than the number of sequential recursive iterations, such that the final homomorphically encrypted solution to the recursive algorithm when decrypted is equivalent to executing the recursive algorithm on unencrypted data; and one or more memories configured to store the final homomorphically encrypted solution to the recursive algorithm.

11. The system of claim 10, wherein the one or more processors are configured to send an external party device the final homomorphically encrypted solution, wherein the external party device stores one or more secret decryption keys in memory to decrypt the final homomorphically encrypted solution.

12. The system of claim 10, wherein the multiple parallel execution iterations arranged in a tree structure, such that:

distal leaf nodes represent an initial parallel execution iteration, each row of successively proximal leaf nodes represents a subsequent parallel execution iteration linking the placeholder call slots in the proximal leaf nodes by branches to the homomorphically encrypted solutions in other leaf nodes from which they depend, and a root node, connected to a plurality of leaf nodes, represents the final homomorphically encrypted solution to the recursive algorithm.

13. The system of claim 10, wherein the multiple parallel execution iterations are arranged in a circuit structure.

14. The system of claim 10, wherein the one or more processors are configured to compute each homomorphically encrypted solution in an mth parallel execution iteration to depend on a predetermined number, q, of homomorphically encrypted solutions from a previous m−1th parallel execution iteration.

15. The system of claim 14, wherein, when the recursive algorithm has i recursive sequential iterations, the one or more processors are configured to compute the final homomorphically encrypted solution of the recursive algorithm in m=$\log_q(i+1)$ parallel execution iterations.

16. The system of claim 15, wherein, when the recursive algorithm has i recursive sequential iterations, the one or more processors are configured to compute a total of $$\frac{i+1}{q^m}$$

partial homomorphically encrypted solutions in each mth parallel execution iteration.

17. The system of claim 14, wherein the one or more processors are configured to execute $$\sum_{k=1}^{m} \frac{i+1}{q^k}$$

recursive sequential iterations in m parallel execution iterations.

18. The system of claim 10, wherein the one or more processors are configured to fill empty placeholder call slots out of the order of the parallel execution iterations, wherein an empty placeholder call slot depends on a complete homomorphically encrypted solution computed in a concurrent or subsequent parallel execution iterations.

19. The system of claim 18, wherein the empty placeholder call slot is connected to the dependent complete homomorphically encrypted solution via a loop in the concurrent parallel execution iteration or a reverse call function from the subsequent parallel execution iteration.

20. A non-transitory computer-readable storage medium encoded with instructions that, when executed, cause one or more processors to:

for a recursive algorithm in which each sequential recursive iteration depends on a complete homomorphically encrypted solution from a previous recursive iteration, execute the recursive algorithm in parallel by computing multiple recursive iterations simultaneously over multiple parallel execution iterations and not in sequential order, wherein each of a plurality of the parallel execution iterations computes a partial homomorphically encrypted solution of multiple sequential recursive iterations comprising a part of the homomorphically encrypted computation that is known and leaves empty a placeholder call slot in place of a part of the computation that is unknown that depends on a complete homomorphically encrypted solution from a previous recursive iteration, wherein the placeholder call slots remain empty and are filled at delayed times at a later parallel execution iteration from when the known part of the same homomorphically encrypted computation is computed, and wherein the multiple parallel execution iterations cumulatively compute a final homomorphically encrypted solution to the recursive algorithm in fewer multiple parallel execution iterations than the number of sequential recursive iterations, such that the final homomorphically encrypted solution to the recursive algorithm when decrypted is equivalent to executing the recursive algorithm on unencrypted data.

* * * * *